United States Patent
Downs et al.

(10) Patent No.: US 6,249,836 B1
(45) Date of Patent: Jun. 19, 2001

(54) METHOD AND APPARATUS FOR PROVIDING REMOTE PROCESSING OF A TASK OVER A NETWORK

(75) Inventors: Terry Downs, Portland; Gregory Hurst Kisor, Beaverton, both of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/313,441

(22) Filed: May 18, 1999

Related U.S. Application Data

(62) Division of application No. 08/777,487, filed on Dec. 30, 1996.

(51) Int. Cl.⁷ .............................. G06F 13/00; G06F 3/00
(52) U.S. Cl. .............................. 710/268; 710/1; 709/227; 709/226; 709/103; 707/104; 703/29; 714/25; 714/48
(58) Field of Search .................................. 710/268, 260; 709/227, 226, 103; 707/104; 703/27; 714/25, 48, 57

(56) References Cited

U.S. PATENT DOCUMENTS

| | | | |
|---|---|---|---|
| 3,421,150 | * 1/1969 | Quosig et al. | 710/264 |
| 4,224,664 | 9/1980 | Trinchieri | 714/25 |
| 5,329,619 | * 7/1994 | Page et al. | 709/203 |
| 5,341,477 | 8/1994 | Pitkin et al. | 709/226 |
| 5,440,741 | 8/1995 | Morales et al. | 709/103 |
| 5,481,698 | 1/1996 | Itoh et al. | 714/48 |
| 5,737,728 | 4/1998 | Sisley et al. | 705/8 |
| 5,748,884 | 5/1998 | Royce et al. | 714/57 |
| 5,826,269 | * 10/1998 | Hussey | 707/10 |

OTHER PUBLICATIONS

Popescu–Zeletin et al., "A Service Platform for Distributed Applications".

* cited by examiner

*Primary Examiner*—Thomas Lee
*Assistant Examiner*—Tammara Peyton
(74) *Attorney, Agent, or Firm*—Blakely, Sokoloff, Taylor & Zafman LLP

(57) ABSTRACT

A method and apparatus for providing remote, distributed processing of a task by employing a wide area network (e.g., the Internet). A resource provider initiates the process by sending an application to a resource allocator requesting to be added to the resource allocator's list of providers. The resource allocator accepts or rejects a particular resource provider based on the application. If accepted, the resource provider waits for a task from the resource allocator. Upon receiving a task, the resource provider evaluates the currently available local resources. The resource provider determines whether or not it is currently able to handle the task in view of the available local resources. If the resource provider is able to handle the task, it accepts the task. The resource provider processes the task and returns the results to either the resource allocator or the original resource requester. If the resource provider is unable to handle the task in view of the current load, the resource provider notifies the resource allocator or the resource requester that it is unable to complete the task.

17 Claims, 7 Drawing Sheets

METHOD AND APPARATUS FOR PROVIDING REMOTE PROCESSING OF A TASK OVER A NETWORK

This application is a divisional application of patent application Ser. No. 08/777,487, filed on Dec. 30, 1996.

BACKGROUND OF THE INVENTION

1. Field of the Invention

The present invention relates generally to distributed processing and relates specifically to a method and apparatus for providing remote, distributed, processing of a task by employing the Internet.

2. Description of the Related Art

In typical distributed systems, a plurality of clients are serviced by one or more servers in a local area network. When a client requires the processing resources of a server, it names a particular server and sends a job to that server. The server queues the particular job and, in turn, executes that particular job and returns the results to the originating client.

This distributed processing model suffers from three distinct disadvantages. First, this distributed processing model is static in that the number of servers is typically fixed and set by a network manager. For example, a typical local area network may have three to four servers that service a number of clients. Since the number of servers is static and does not change unless a new server is physically added to the local area network (i.e., an additional server is purchased and installed into the network), the computing resources available to the clients in the local area network are also fixed.

A second disadvantage is that computer systems are typically under-utilized. For example, a home computer typically is idle (or handling trivial tasks that require a small fraction of the processing power available, (such as serving as a phone message machine) when one is at a workplace, and one's workplace computer is idle when one is at home. Additionally, most home computers are idle during the times when one is asleep.

A third disadvantage of prior art distributed processing models is that for jobs requiring a substantial amount of processing or computing resources, the clients of the local area network are relegated to one of two non-optimal choices. First, a client can send a job to an outside source that will process the job. However, this option is costly and wasteful of time since the client must come to an agreement with an outside vender over price and quality of service and physically transfer the job to that vendor. Moreover, the vendor, who is typically remote physically from the client, must process the job and physically return the results back to the client. A second option, if the servers in a LAN can handle the job, is to allow the client to monopolize system resources and to process the job, while the other clients in the network wait for processing resources. A third option is to dispatch the job to a multi-tasking server, which will run the job with other jobs. The this third option reduces system performance since a multi-tasking server is typically slower than a single thread server. It is evident that none of these options are favored by a network administrator.

A fourth disadvantage is that the typical distributed processing model does not allow for an easy to use accounting system where clients can pay for a particular processing job and resource providers/servers can obtain payment for the use of their resources.

Accordingly, there is presently an unmet need in the industry for a method and apparatus for providing improved distributed processing that overcomes the disadvantages mentioned previously.

SUMMARY OF THE INVENTION

A method and apparatus for providing remote, distributed processing of a task by employing the Internet is herein disclosed. A network in which the present invention may be implemented includes a client that has a task that needs to be accomplished, a plurality of resource providers that provide processing resources, and a server that allocates the resources, offered by the resource providers, to the clients requesting resources. First, the resource provider that is willing to sell resources communicates to the owner of the server the resource provider's intent to sell its resources. The resource provider also communicates to the server a description of the available resources of that resource provider (e.g., processor power, memory, operating system, etc.). Second, a client that needs processing for a particular task, sends a request for service to the server. Third, the server matches the request for service to one of the resource providers, and transfers the task to that resource provider. Next, the resource provider performs the task to completion or notifies the server that it cannot complete the task. After the server transfers the task to the resource provider, the network connection between the server and the resource provider can be terminated. Finally, if the task is completed successfully, the resource provider transfers the results back to the server that, in turn, sends the results to the client. The server manages and tracks the dynamic state of the available resources from the resource providers at any given time. Moreover, the server performs the business function of charging the client for services performed and paying the resource providers for services rendered. The server also offers a minimum level of service and a level of guarantee so that clients can select a variety of options that correspond to the client's task, cost, and time requirements.

BRIEF DESCRIPTION OF THE DRAWINGS

The objects, features and advantages of the method and apparatus for the present invention apparent from the following description in which.

DETAILED DESCRIPTION OF THE INVENTION

Referring to the figures, exemplary embodiments of the invention will now be described. The exemplary embodiments are provided to illustrate aspects of the invention and should not be construed as limiting the scope of the invention. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Figure 1:
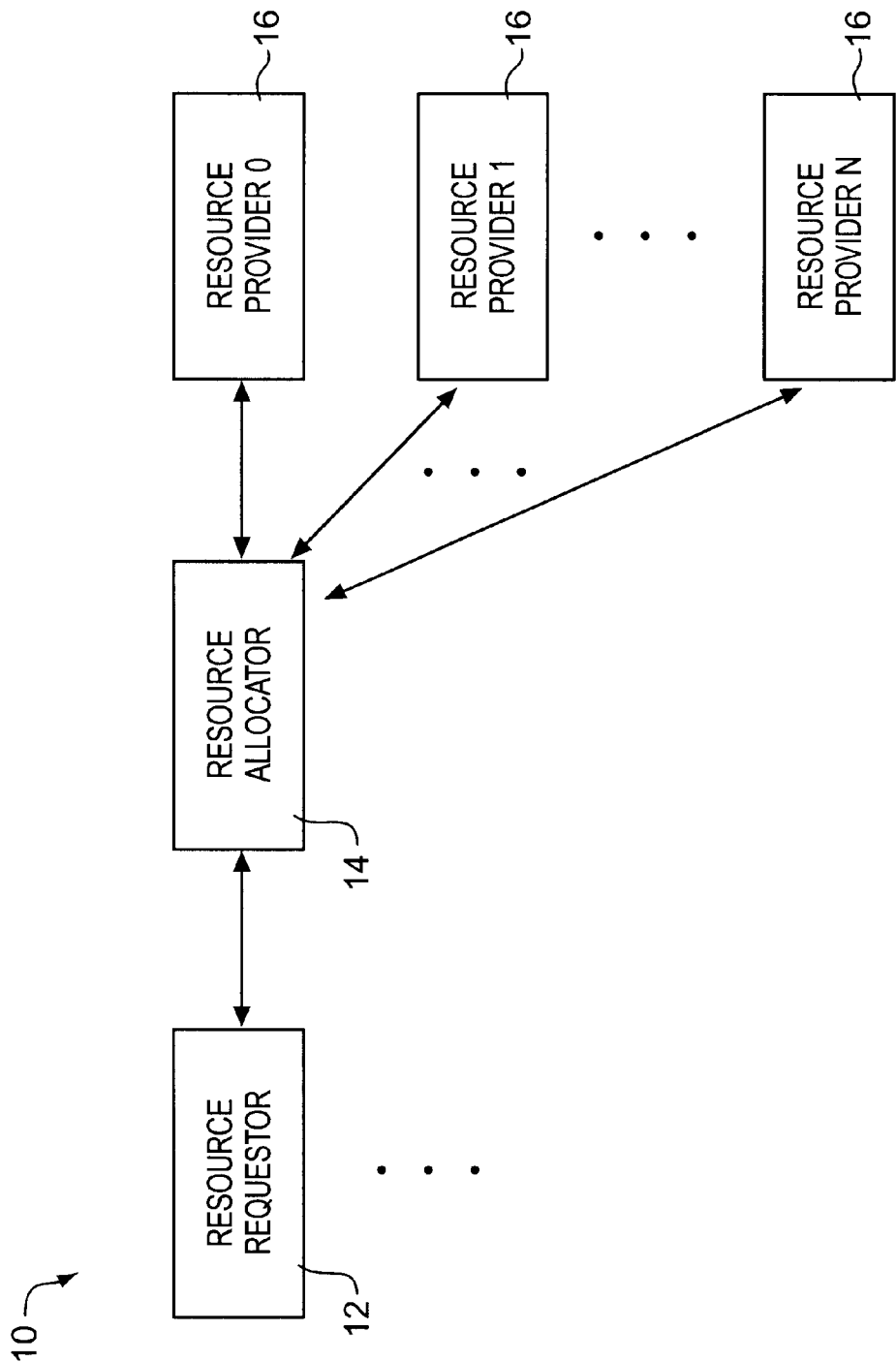
FIG. 1 illustrates computer systems in a network that are configured in accordance with the teachings of the present invention.

FIG. 1 illustrates computer systems interconnected in a network 10 and configured in accordance with the teachings of the present invention. The network 10 includes a resource requester 12, a resource allocator 14 and a plurality of resource providers 16 interconnected in a network. This network can be a wide area network (WAN), such as the Internet. It should be noted that the computer system configured in accordance with the present invention allows the resource providers 16 to be continuously connected or intermittently connected to the resource allocator 14. The resource requester 12 is simply a client that needs computing or processing resources for a task. This task, for example, can be a video compression task or an image compression task. The resource allocator 14 is simply a server that assigns a particular task to one of a plurality of resource providers 16. The resource providers 16 are simply computer systems with resources (e.g., processing power) that the resource provider 16 is willing to sell to clients, such as the resource allocator 14 and the resource requesters 12.

It is important to note that the number of resource providers 16, associated with a resource allocator 14, is dynamic and varies with respect to time. The number of resource providers is limited only by the number of entries in the resource table. Moreover, it is important to note that the resource requesters 12 and the resource providers 16 need not be continuously connected to the network. Furthermore, the present invention can employ intermittent connections between the resource requesters 12, resource allocator 14 and resource providers 16.

Figure 2:
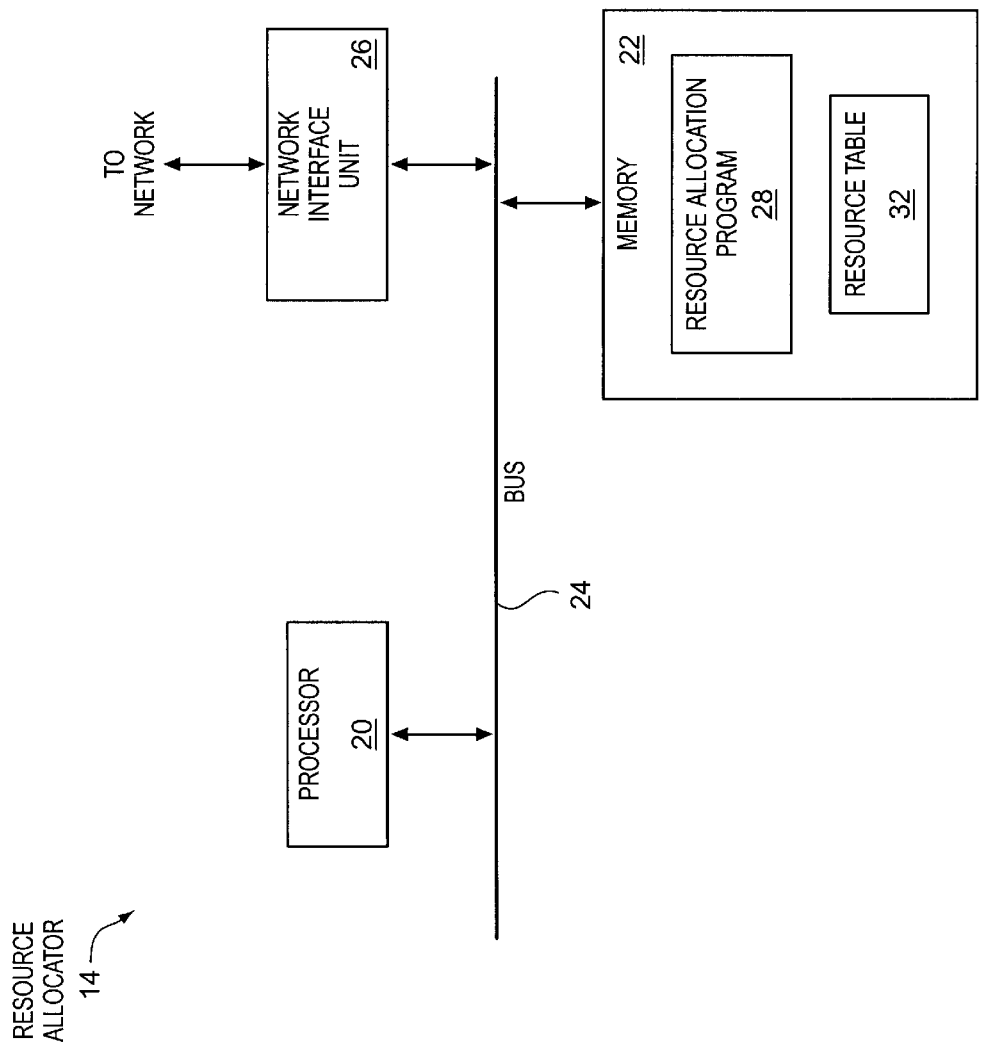
FIG. 2 illustrates a simplified block diagram of the resource allocator, configured in accordance the teachings of the present invention.

FIG. 2 illustrates a simplified block diagram of the resource allocator 14, configured in accordance with the teachings of one embodiment of the present invention. The resource allocator 14 is a server that includes a processor 20 coupled to a memory 22 via a bus 24. The memory 22 includes a resource allocation program 28 and a resource table 32. The resource allocation program 28 of the present invention will be described in greater detail hereinafter with reference to FIG. 3. The resource allocation program 28, when executed by the processor 20, performs the steps outlined and hereinafter described in FIG. 6. The resource allocator 14 also includes a network interface unit 26 that provides an interface between the resource allocator 14 and the network 10. It will be evident to those skilled in the art that the resource allocator 14 can be configured with duplicate components (e.g., a plurality of processors 20) and other components not shown.

Figure 3:
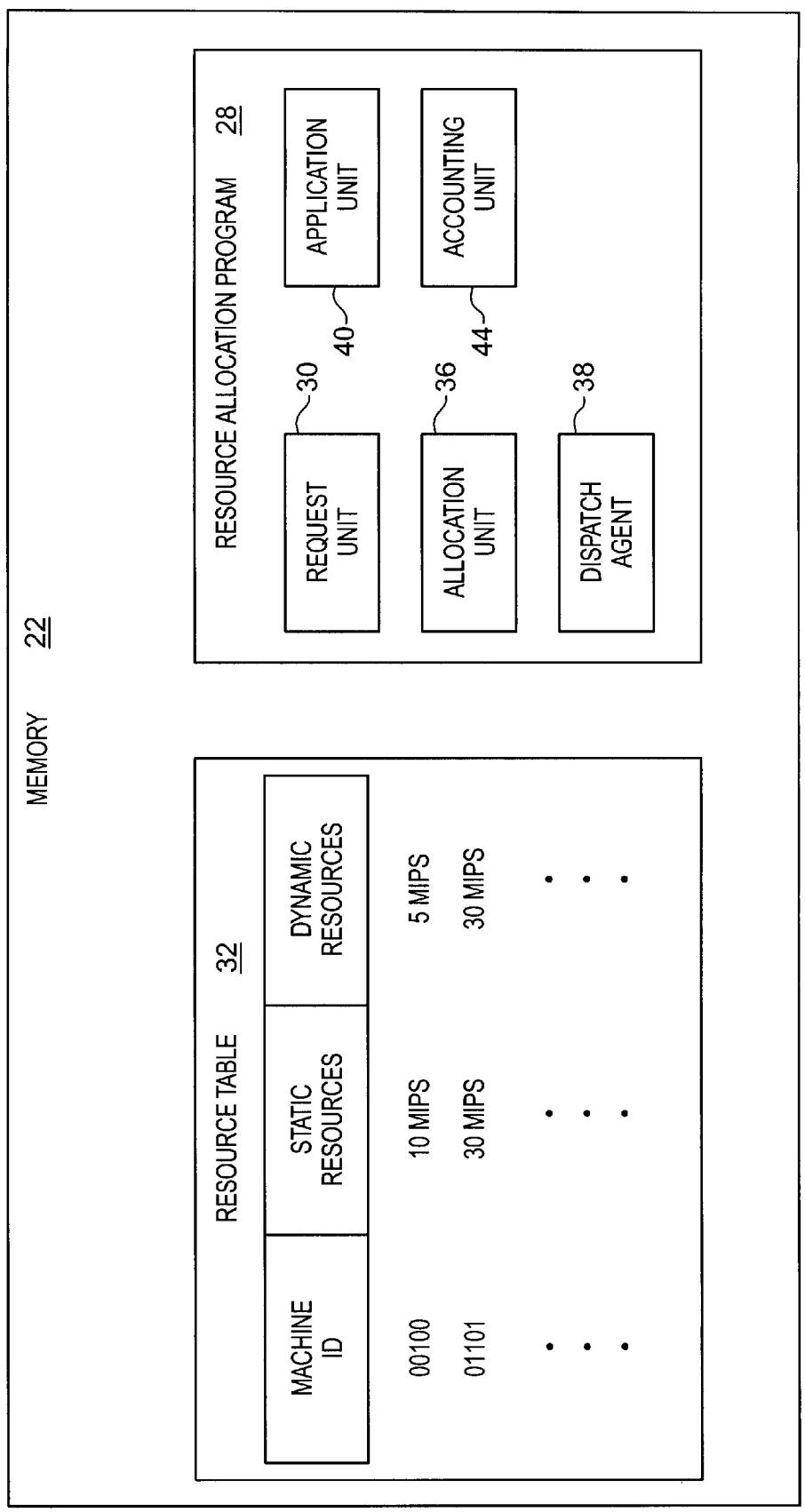
FIG. 3 illustrates a simplified block diagram of the resource allocation program, configured in accordance with one embodiment of the present invention.

FIG. 3 illustrates a simplified block diagram of the resource allocation program 28 of one embodiment of the present invention. The memory 22 includes a resource allocation program 28 and a resource table 32. The resource allocation program 28 that resides in memory 22 includes a request unit 30, an allocation unit 36, a dispatch agent 38, an application unit 40 and an accounting unit 44 (optional).

The request unit 30 includes software code that receives a service request from a resource requester 22, checks the resource table 32 to determine if a resource provider 16 is currently available to handle the service request, and notifies the resource requester 12 that the resource allocator 14 can handle the service request or that the resource allocator 14 at the current time cannot handle the service request.

The allocation unit 36 includes software code to receive a job definition from the resource requester 12, to assign a particular resource provider 16 to the task (also referred to as a job definition) based on the resource table 32, and to update the resource table 32 to reflect the allocation of the resources for that particular task.

The dispatch agent 38 includes software code that under the direction of the allocation unit 36 transfers the task to the designated resource provider 16. For example, the dispatch agent 36 can transfer executable code, data, and specifications describing the file and format of the results to the designated request provider 16. When a resource provider 16 returns results to the dispatch agent 38, the dispatch agent 38, in turn, returns the results to the resource requester 12. The dispatch agent 38 is also responsible for informing the resource requester 12 of any failures of the resource provider 16 to provide the results within predefined constraints (time, cost or actual system or power failure).

In an alternative embodiment, the dispatch agent 38 includes software code to periodically poll the various resource providers 16 to determine whether or not those resource providers 16 are still available to provide resources. The dispatch agent 38 also insures that a minimal level of service, as well as, a guarantee of service requirements specified by the resource requester 12, are met, and if these constraints cannot be met, the dispatch agent 38 notifies the resource requester 12 of the failure.

The application unit 40 includes software code to accept or reject applications sent by the resource providers 16. If an application of a resource provider 16 is accepted, the application unit 40 adds the information associated with the resource provider to the resource table 32. This information can include a machine identifier (e.g., an Internet Protocol (IP) address), and a description of the available resources (e.g., processor type, memory size, storage space, operating system, etc.).

The accounting unit 44 includes software code to bill the resource requesters 12 for services rendered and to pay the resource provider 16 for services provided. The accounting unit 44 manages the payments and bills and performs a metering function for the resource allocation program 28.

Figure 4:
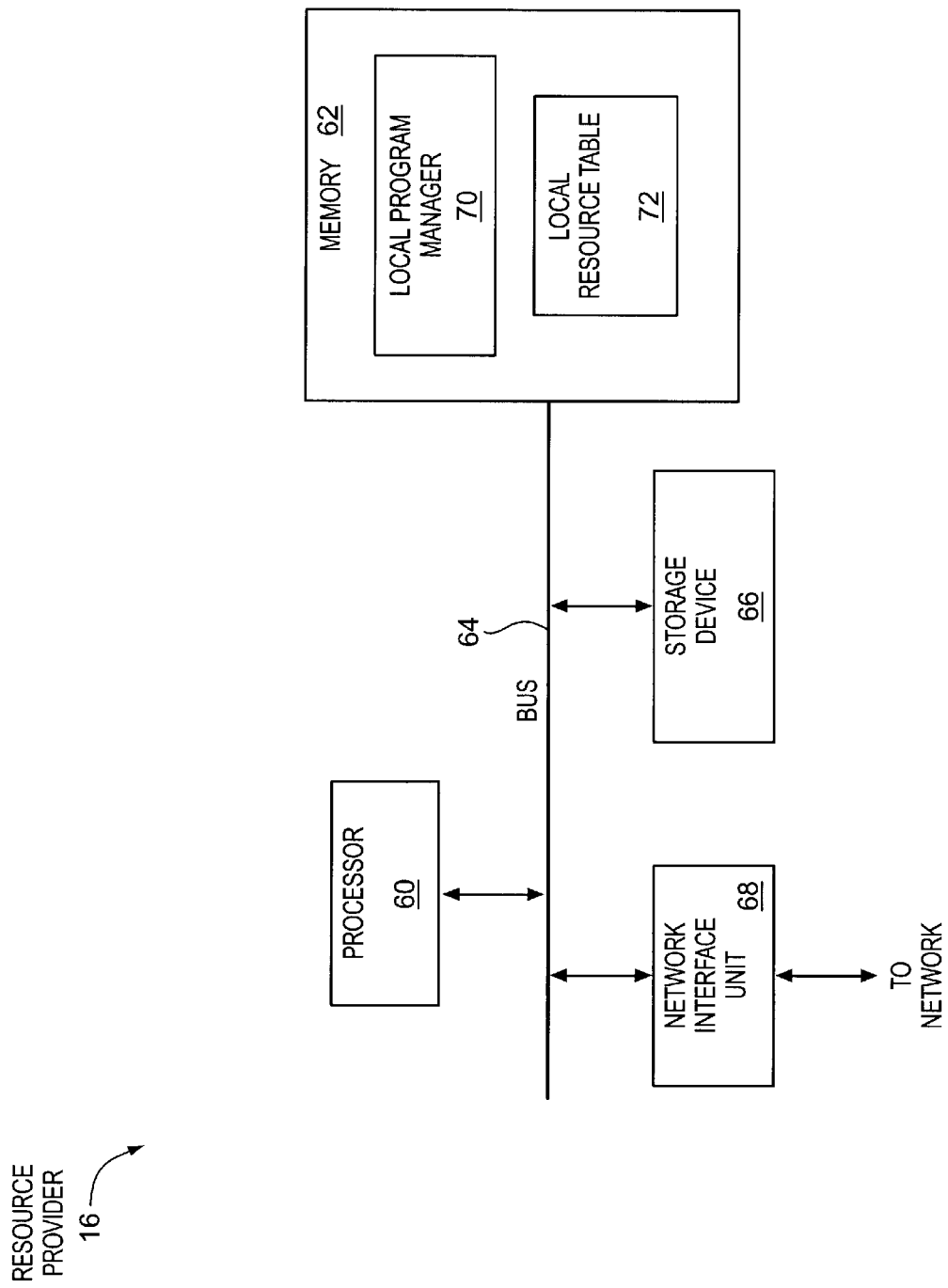
FIG. 4 illustrates a simplified block diagram of the resource provider, configured in accordance with the teachings of the present invention.

FIG. 4 illustrates a simplified block diagram of the resource provider 16, illustrated in FIG. 1, configured in accordance with one embodiment of the present invention. The resource provider 16 is a computer system that includes a processor 60, coupled to a memory 62, via bus 64. A data storage unit 66 (e.g., hard disk drive) can also be coupled to the resource provider system 16 to store data (e.g., an output file containing the results of a task). The memory 62 includes a local manager program 70 and a local resource table 72 that will be described in greater detail hereinafter with reference to FIGS. 5 and 7. The resource provider 16 also includes a network interface unit 68 that provides an interface between the resource provider 16 and the network 10.

Figure 5:
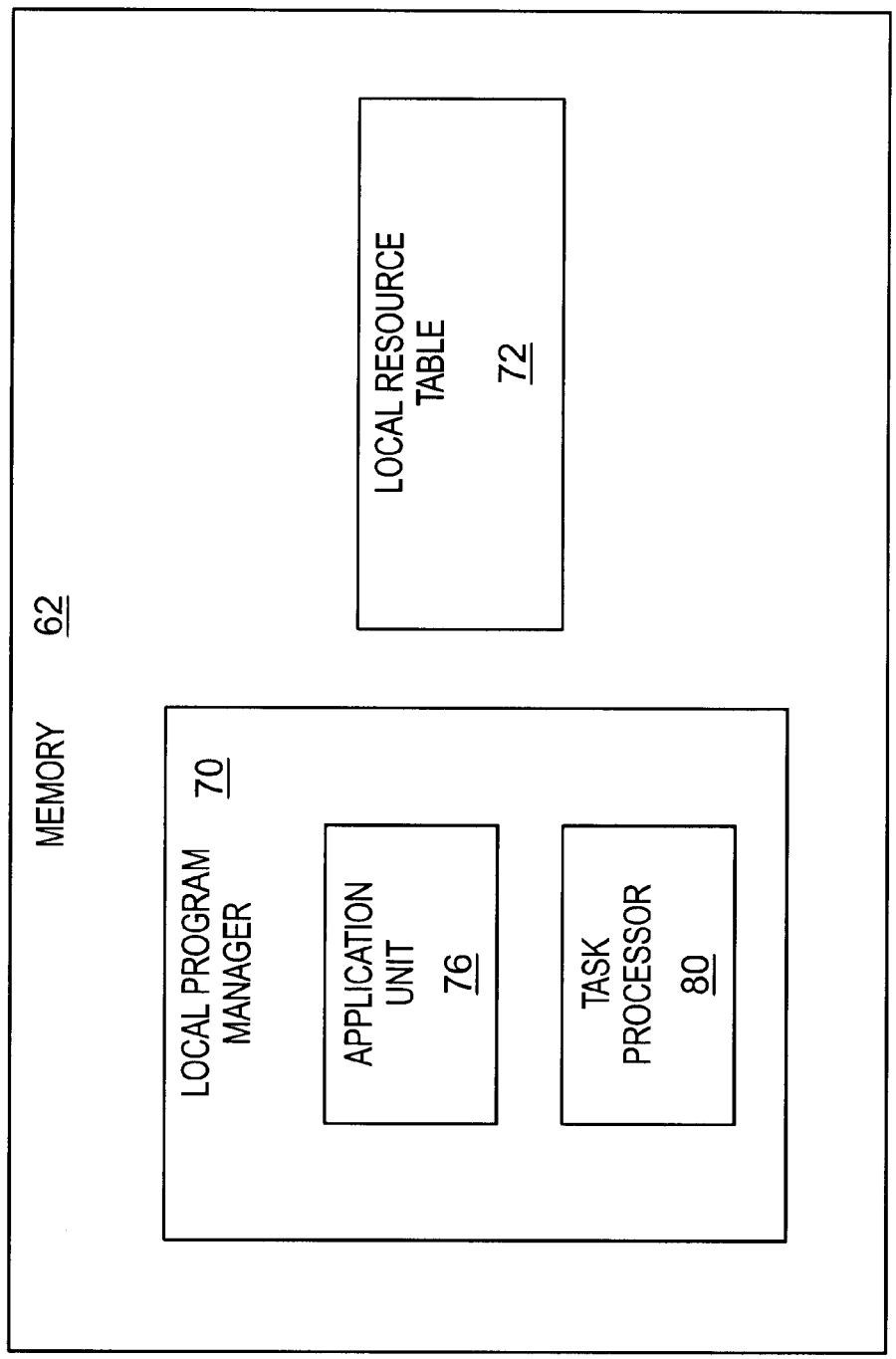
FIG. 5 illustrates a simplified block diagram of the local manager program, configured in accordance with the teachings of the present invention.

FIG. 5 illustrates in greater detail the local program manager 70 and the local resource table 72 in accordance with one embodiment of the present invention. The memory 62 includes a local program manager 70 and a local resource table 72. The local program manager 70 further includes an application unit 76 that sends an application to the resource allocator 14 requesting to be added to the resource allocator's list of resource providers. The local program manager 70 also includes a task processor 80 that manages tasks assigned by the resource allocator 14. The task processor 80 takes into account the load on the local system by querying the local resource table 72. The specific steps performed by the local program 70, when executing on processor 60, will be described in greater detail hereinafter with reference to FIG. 7.

Figure 6:
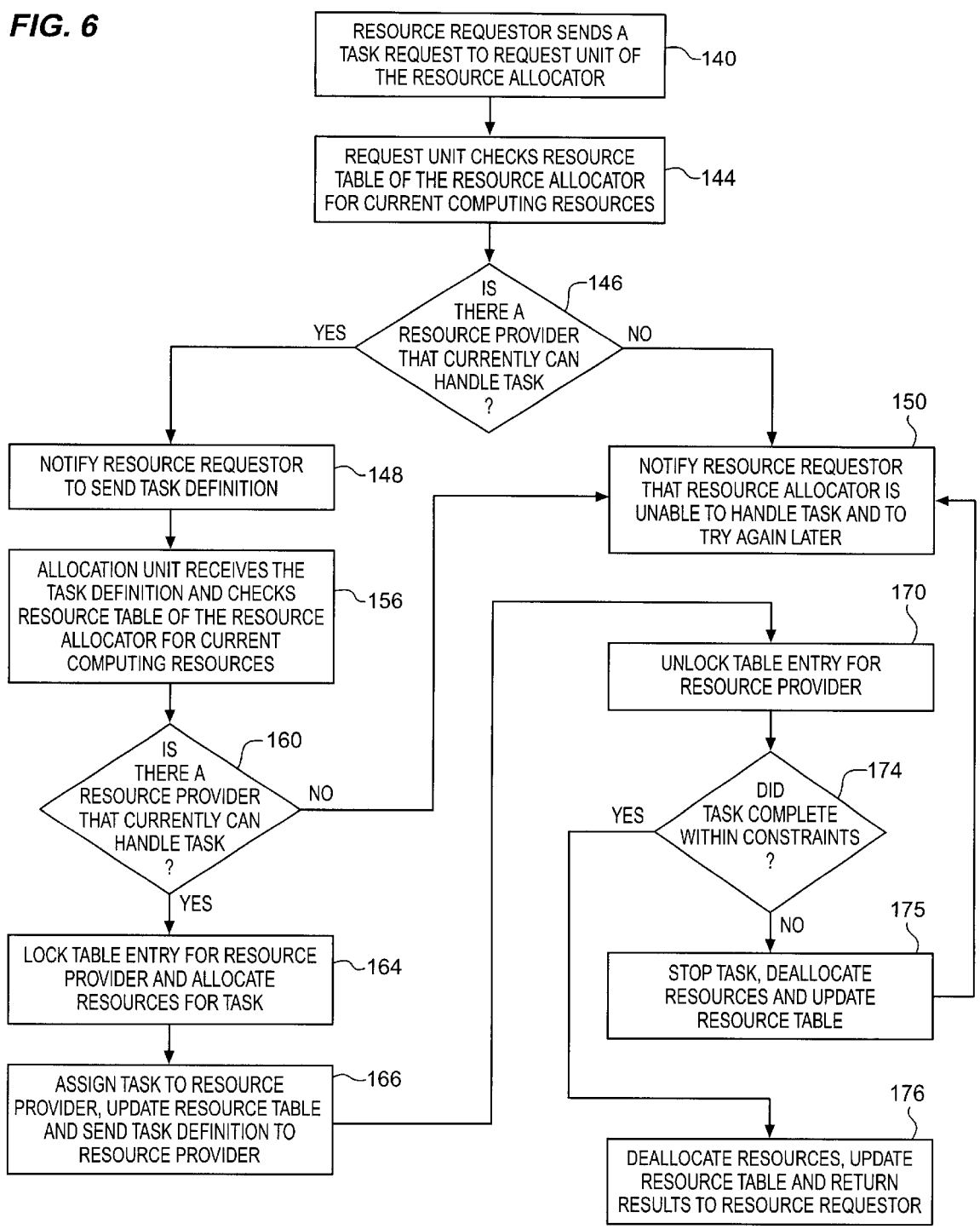
FIG. 6 is a flowchart illustrating the processing steps of the resource allocation program in accordance with one embodiment of the present invention.

FIG. 6 is a flowchart illustrating the processing steps of the resource allocation program 28 in accordance with one embodiment of the present invention The resource allocation program 28, when executing on processor 20, performs the following steps. In processing step 140, the resource requester 12 sends a task request (herein also referred to as a service request) to request unit 30 of the resource allocation program 28. The task request describes the specifics of the task requested. This task request can specify, for example, the time constraints, cost limits, required processing power, and other job details.

In processing step 144, the request unit 30 checks the resource table 32 of memory 22 for the current computing resources available. The resource table 32 includes a plurality of entries with each entry having specified fields. These fields can include a machine identification (e.g., an Internet address), a static resource field that defines the maximum computing resources of a particular resource provider 16, and a dynamic resource field that provides a currently available and non-allocated computing power for that resource provider 16.

In decision block 146, the request unit 30 determines whether or not there is a resource provider 16 that can handle the task at the present time. If yes, the request unit 30 notifies the resource requester 12 to send a task definition (processing step 148). As noted previously, a task definition can include information such as the executable code file, the data file, as well as, a specification of how the results of the computation are to be stored. If no, the request unit 30 notifies the resource requester 12 that the resource allocator 14 is unable to handle the task at the present time and to try again later (processing step 150).

In processing step 156, an allocation unit 36 receives a task definition and checks the resource table for the current computing resources. In processing step 156, the allocation unit 36 essentially repeats what the request unit 30 performed in processing step 144. Processing step 156 is important because the request for processing resources is dynamic and constantly in flux. Accordingly, resources that were available at processing step 144 may now be unavailable at processing step 156, because the resource allocator 14 may have allocated the resources to another resource requester 12 in the interim time between processing step 144 and processing step 156.

In determination block 160, the allocation unit 36 determines if there is a resource provider 16 that can currently handle the task. For example, the allocation unit 36 checks the entries in the resource table 32, and specifically the dynamic resource field of each entry. If a resource provider 16 is found that has an adequate amount of dynamic resources to handle the task, the allocation unit 36 locks that table entry for that particular resource provider and allocates resources of that resource provider for the task (processing step 164). The allocation unit 36 assigns the task to that resource provider, updates the resource table, and sends the task definition to that resource provider (processing step 166). The allocation unit 36 unlocks the table entry for the designated resource provider in processing step 170.

In this embodiment, the allocation unit 36 calls a dispatch agent 38 to forward the task definition to the designated resource provider 16. The dispatch agent 38 determines in decision block 174 whether or not the task is completed by the resource provider 16 within specified constraints. If no, the dispatch agent 38 returns control to allocation unit 36 that stops the task, deallocates resources and updates the resource table (processing step 175). The dispatch agent 38 then notifies the resource requester 12 that the resource allocator 14 could not process the task (processing step 150). If yes, the dispatch agent 38 returns control to the allocation unit 36 which de-allocates the resources, updates the resource table, and returns the results to the resource requester 12 (processing step 176).

The specified constraints noted in decision block 174 can include time constraints, cost constraints, power failure, and any other failure on the part of the resource provider 16 to complete the task.

If the task did not complete within the specified constraints, in addition to notifying the resource requester 12, the dispatch agent 38 can also relinquish control to the allocation unit 36 that in turn deallocates the resources and updates the resource table.

Figure 7:
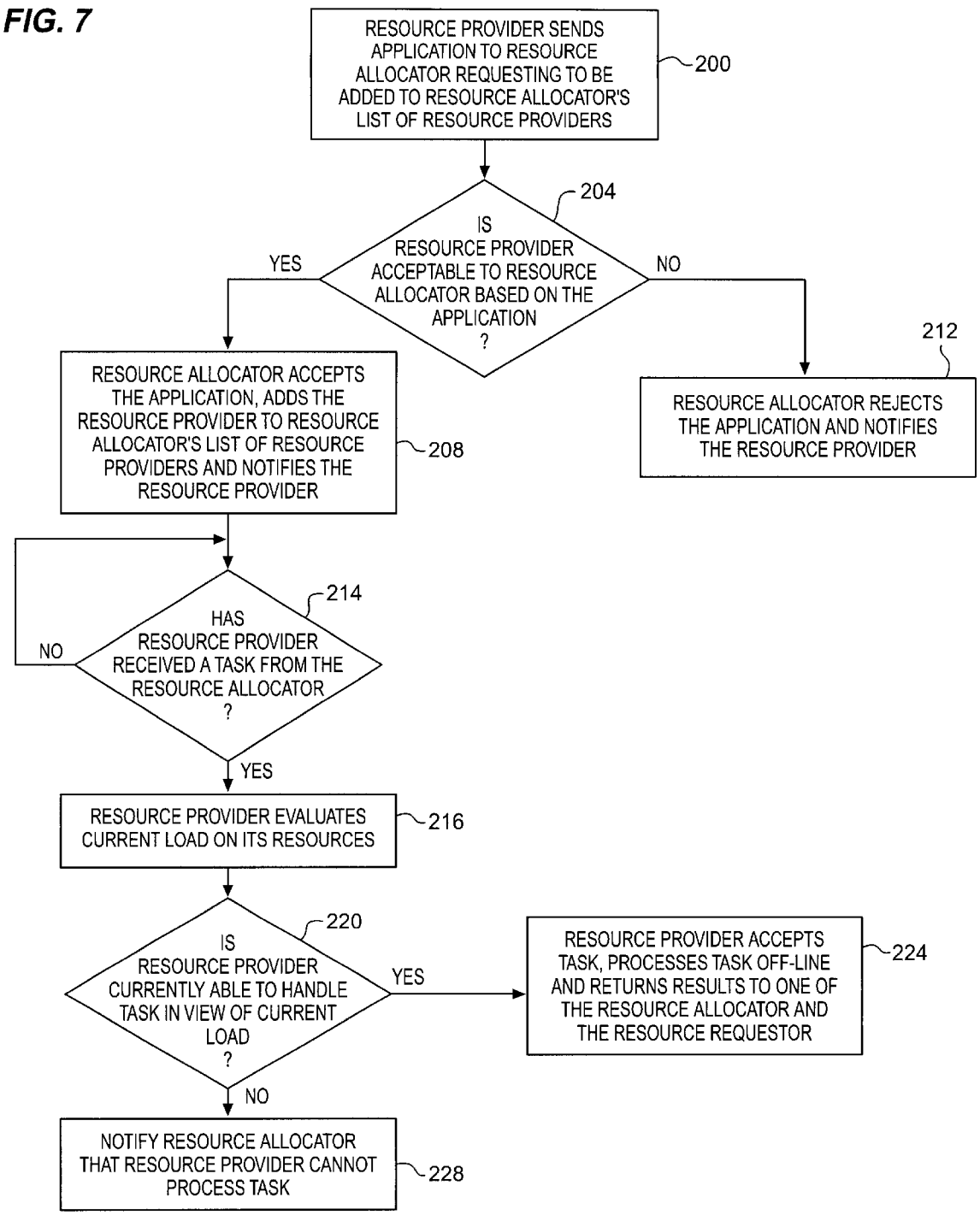
FIG. 7 is a flowchart illustrating the processing steps of the local manager program in accordance with one embodiment of the present invention.

FIG. 7 is a flowchart illustrating the processing steps of a local manager program 70 of a resource provider 16 in accordance with one embodiment of the present invention.

The local program manager 70 of FIGS. 4 and 5, when executing on processor 60, performs the following steps. In processing step 200, the resource provider 16 sends an application to the resource allocator 14 requesting to be added to the resource allocator's list of resource providers. In decision block 204, the request unit 30 of the resource allocation program 28 determines if the resource provider is acceptable to the resource allocator 14 based on the application. If yes, the resource allocator 14 accepts the application, adds the resource provider 16 to the resource allocator's list of resource providers, and notifies the resource provider 16 (processing step 208). If not, the resource allocator rejects the application and notifies the resource provider 16 of the same (processing step 212).

As noted previously, this application for registering with the allocator, can include, among other fields of information, 1) a description of the computing resources of that resource provider (e.g., processor type, operating system, memory available, storage capacity, etc.); and 2) the terms of compensation for the provision of computing resources (e.g., monetary, free Internet access time, etc.).

In determination block 214, the local program manager 70, executing on processor 60, waits for a task from the resource allocator 14. If no task has yet been received from the resource allocator 14, the resource provider 16 waits until such a task is received. In processing step 216, the resource provider 16 upon receiving a task from the resource allocator 14, evaluates the current load on the computing resources of the resource provider 16 by checking the local resource table 72.

In determination block 220, the local program manager 70 determines whether or not the resource provider 16 is able to handle the task in view of the current load. If yes, the resource provider 16 accepts the task, processes the tasks off-line, and returns the results either directly to the resource requester 12 or indirectly to the resource requester 12 through the resource allocator 14 (processing step 224). If no, the resource provider 16 notifies the resource allocator 14 that the resource provider currently cannot process the task (processing step 228). The application can also include terms such as a level of guarantee specifying a minimum level of service and an indicator of an absolute commitment or a best efforts commitment.

When the resource provider 16 evaluates the current load of its resources, the resource provider 16 can consider such factors as other devices in the local system that may require the processor and/or computing power.

After the resource provider receives the task from the resource allocator, the resource provider 16 can process the task off-line (i.e., the Internet connection between the resource provider and resource allocator can be terminated), and the results are returned either to the resource allocator 14 or the resource requester 12 via commonly known methods, such as electronic mail.

The exemplary embodiments described herein are provided merely to illustrate the principles of the invention and should not be construed as limiting the scope of the invention Rather, the principles of the invention may be applied to a wide range of systems to achieve the advantages described herein and to achieve other advantages or to satisfy other objectives as well.

What is claimed is:

1. A method of computing, comprising:
   a first computer receiving a first request, over a first network connection to a second computer system, to have a first set of executable code executed;
   the first computer system processing a first application conveying a third computer system's hardware capabilities; and
   the first computer system facilitating transfer of the first set of executable code to the third computer system determined by the first application;
   wherein the transfer is effectuated through a second networking connection between either the first or the second computer system to the third computer system.

2. A method according to claim 1, in which there can be plural computer systems for receiving the transfer, the method further comprising:
   the first computer system selecting the third computer system as recipient of the transfer, in view of the third computer system's hardware capabilities.

3. A method according to claim 1, further comprising:
   the first computer system receiving information conveying service requirements associated with the first set of executable code.

4. A method according to claim 3, wherein the service requirements include at least a selected one of a hardware requirement and a service quality level requirement for executing the first set of executable code.

5. A method according to claim 1, further comprising:
   the first computer system receiving the first set of executable code from the second computer system; and
   the first computer system transferring the first set of executable code to the third computer system.

6. A method according to claim 5, further comprising:
   the first computer receiving a response from the third computer system;
   wherein the response comprises indication of whether the third computer will execute the first set of executable code.

7. A method according to claim 1, further comprising:
   the first computer system notifying the second computer system to transfer the first set of executable code to the third computer system.

8. An article of manufacture comprising a computer readable medium having encoded thereon computer instructions capable of causing a processor to perform the steps of claim 1.

9. A method of computing, comprising:
   a first computer receiving a first request, over a first network connection with a second computer system, to have a first set of executable code executed;
   the first computer system processing a first application conveying a fourth computer system's hardware capabilities;
   the first computer system processing a second application conveying a fifth computer system's hardware capabilities;
   the first computer receiving a second request, over a second network connection with a third computer system, to have a second set of executable code executed;
   the first computer system facilitating transfer of the first set of executable code to the fourth computer system determined by the first application, where the transfer is effectuated through a third networking connection between either the first or the second computer system to the fourth computer system; and
   the first computer system facilitating transfer of the second set of executable code to the fifth computer system determined by the second application, where the transfer is effectuated through a fourth networking connection between either the first or the third computer system to the fifth computer system.

10. A method according to claim 9, wherein the second and the third computer systems are the same computer system.

11. A method according to claim 9, wherein the fourth and the fifth computer systems are the same computer system.

12. A method according to claim 9, in which the fourth and fifth computing systems are members of a group of computing systems for receiving transfer of executable code, the method further comprising:
    the first computer system receiving service requirements associated with the first set of executable code;
    the first computer system receiving service requirements associated with the second set of executable code;
    selecting the fourth computing system, from the group of computing systems, according to the service requirements associated with the first set of executable code; and
    selecting the fifth computing system, from the group of computing systems, according to the service requirements associated with the second set of executable code.

13. An article of manufacture comprising a computer readable medium having encoded thereon computer instructions capable of causing a processor to perform the steps of claim 12.

14. A method according to claim 12, wherein the first computer transfers executable code to the fourth and fifth computer systems.

15. A method according to claim 12, wherein the first computer transfers executable code to a recipient computer system selected from the group of computer systems.

16. A method according to claim 15, wherein the recipient computer transfers executable code, received from the first computer system, to the fourth and fifth computer systems.

17. A method of computing, comprising:
    a first computer system dynamically processing an application conveying a second computer system's processing capabilities;
    the first computer system receiving a request, over a first network connection to a third computer system, to have a set of executable code executed; and
    the first computer system facilitating transfer of the set of executable code to the second computer system determined by the second computer system's processing capabilities contained in the application;
    wherein the transfer is effectuated through a second networking connection between either the first or a third computer system to the second computer system.

* * * * *